April 20, 1926.
G. L. KOLLOCK
ELECTRIC DRILL
Original Filed July 11, 1923
1,581,927
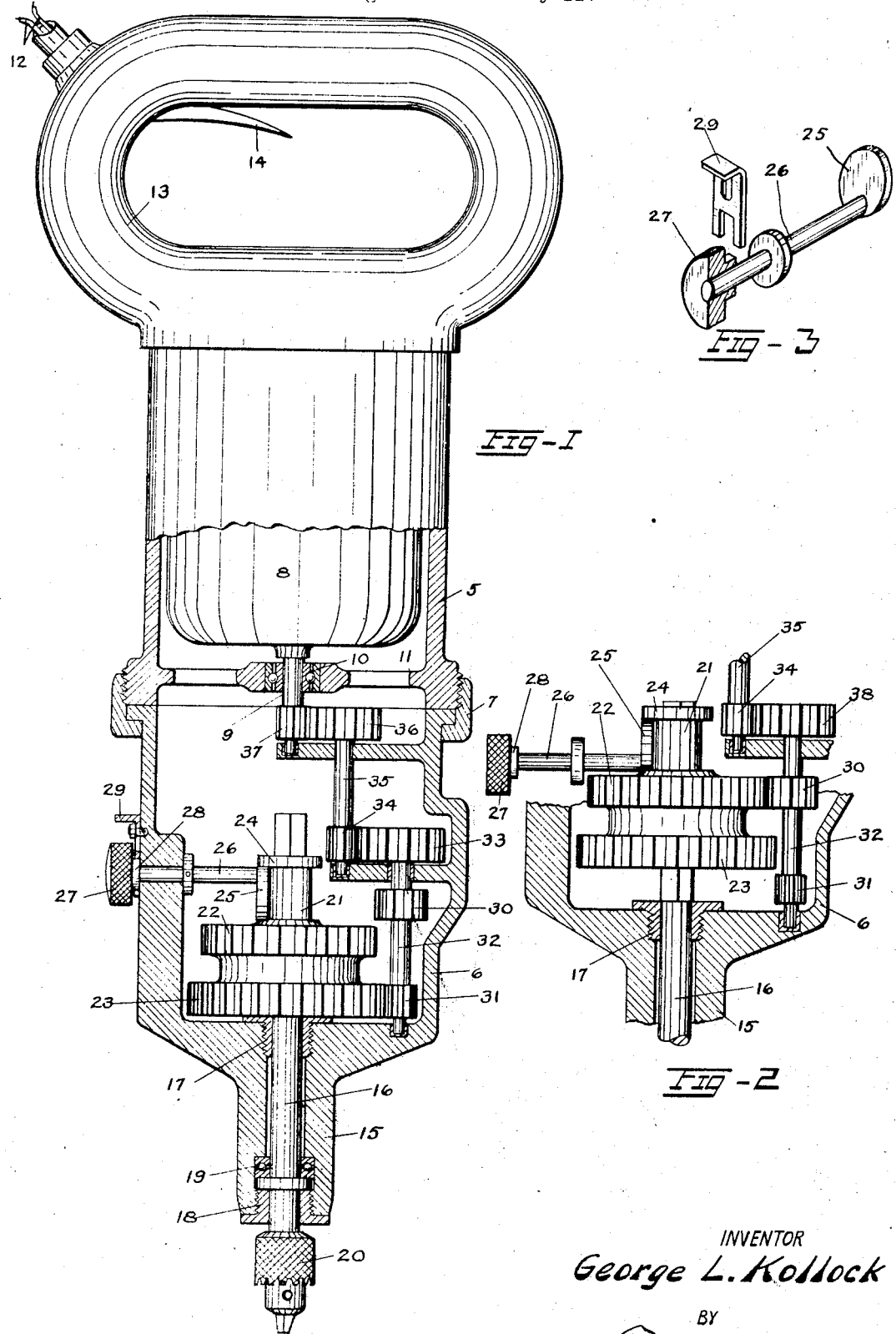
INVENTOR
George L. Kollock
BY
Frank Warren
ATTORNEY Patented Apr. 20, 1926.

1,581,927

UNITED STATES PATENT OFFICE.

GEORGE L. KOLLOCK, OF SEATTLE, WASHINGTON.

ELECTRIC DRILL.

Application filed July 11, 1923, Serial No. 650,864. Renewed January 20, 1926.

*To all whom it may concern:*

Be it known that I, GEORGE L. KOLLOCK, a citizen of the United States, residing at Seattle, in the county of King and State of Washington, have invented a certain new and useful Improvement in Electric Drills, of which the following is a specification.

My invention relates to improvements in portable electric drills and the object of my invention is to provide an electrically operated portable drill having a variable speed power transmission capable of being adjusted to different speeds to suit the requirements of drills of different size.

Another object is to provide an electrically operated portable drill which will be of comparatively simple, inexpensive and durable construction and which will perform its functions in an efficient manner.

I accomplish these objects by devices illustrated in the accompanying drawings, wherein—

Figure 1 is a view in vertical mid-section of a drill constructed in accordance with my invention, parts being shown in elevation;

Fig. 2 is a detached view of parts of the transmission gear showing the same in a different operative position from that shown in Fig. 1; and Fig. 3 is a detached view in perspective of parts of the gear shifting devices.

Referring to the drawings throughout which like reference numerals indicate like parts, 5 designates an upper cylindrical housing member and 6 designates a lower cylindrical housing member that is secured to the upper housing member 5 by a coupling ring 7.

The housing member 5 is adapted to contain an electric motor 8 having a driven shaft 9, preferably arranged co-axial with the housing, and journalled in a bearing 10 in a bracket 11 that is rigid with the housing.

Electric current may be supplied to the motor 8 by wires 12 that enter the housing 5 through a handle element 13 that is secured to the upper end of such housing. A switch lever 14 may be used to operate switch mechanism, not shown, for controlling the flow of electric current to said motor.

The lower housing member 6 forms a gear case for the variable speed gears and terminates at its lower end in a housing shank 15 of reduced diameter wherein is journaled a drill shaft 16, suitable bearing members 17 and 18 being provided at the upper and lower ends of the shank 16 and ball thrust bearing 19 being provided in connection with the lower bushing. A chuck 20 may be provided on the lower end of the drill shaft 16.

The upper end of the drill shaft 16 is square or is otherwise shaped for slidably, but not rotatably, receiving a sleeve 21 on the lower end of which are two spur gears 22 and 23 of different size. An internal annular flange 24 is provided near the upper end of the sleeve 21 and a disc 25 eccentrically secured to a spindle 26 is interposed between the flange 24 and the upper surface of the uppermost spur gear 22. The spindle 26 extends outwardly through the housing 6 and is provided on its outer end with a finger piece 27 by which it may be turned. Any suitable means may be provided for locking the spindle in a set position as for instance the inner hub portion 28 of the finger piece may be flattened or square and may be arranged to be engaged and held by a clip 29 that is slidably mounted on the exterior wall of the housing 6 and arranged to fit like a wrench over the hub portion 28 of the finger piece 27. Rotation of the eccentric disc 25 through an angle of one hundred and eighty degrees will move the gears either from the lowermost position shown in Fig. 1 to the uppermost position shown in Fig. 2 or from the uppermost to the lowermost position.

The gears 22 and 23 are arranged to be selectively moved into and out of mesh with pinions 30 and 31 on a jack shaft 32 that is journaled in the housing 6 and is provided on its upper end with a spur gear 33 that meshes with a pinion 34 on an idler shaft 35 that is also journaled in the housing 6 and is provided on its upper end with a spur gear 36 that meshes with a pinion 37 on the lower end of the motor shaft 9.

In operation, when the gear 23 is in mesh with the pinion 31, as shown in Fig. 1, a relatively low speed drive of the drill shaft 16 will be had through the motor driven pinion 37, spur gear 36, shaft 35, pinion 34, spur gear 33, jack shaft 32, pinion 31 and spur gear 23. If, from this position, the eccentric disc 25 is rotated one half of one complete revolution, gears 22 and 23 will be moved from the position shown in Fig. 1 to the position shown in Fig. 2, unmeshing gear 23 and pinion 31 and moving gear 22 into mesh with gear 30 so that a higher speed drive will be communicated to drill shaft 16 through motor driven pinion 37, gear 36, shaft 35, pinion 34, gear 33, jack shaft 32, gear 30 and gear 22.

It is obvious that, for a constant speed and torque of the motor shaft 9, a comparatively higher speed and less torque will be communicated to the drill shaft 16 if the larger pinion 30 on the jack shaft 32 is in mesh with the smaller gear 22 on the motor shaft; and a comparatively lower speed and greater torque will be communicated to the drill shaft 16 if the smaller pinion 31 on the jack shaft 32 is in mesh with the larger gearwheel 23 on the motor shaft.

The gear condition affording the higher speed and less torque is of advantage when a relatively small drill is being used and the gear condition affording lower speed and greater torque is of advantage when larger drills are being used.

The provision of a variable speed gear in a portable electric drill make possible the use of a motor of minimum size and weight for the reason that it makes it possible to always drive the motor at the speed at which it develops the highest efficiency.

The device is herein described as an electric drill but it will be obvious that such device may be used for driving various other tools as reamers, countersink tools and the like.

The foregoing description and accompanying drawings clearly disclose which I now consider to be a preferred embodiment of the invention but it will be understood that this disclosure is merely illustrative and that such changes may be made as are within the scope and spirit of the following claim.

What I claim is:

A portable electric drill embodying a housing, a drill shaft rotatably mounted in said housing, a motor mounted in said housing, a shaft connected with said motor, a pinion on said motor shaft, an idler shaft, a gear on the upper end of said idler shaft in mesh with the pinion on said motor shaft, a pinion on the lower end of said idler shaft, a jack shaft, a gear on the upper end of said jack shaft in mesh with the pinion on the lower end of said idler shaft, a larger pinion on said jack shaft, a smaller pinion on said jack shaft, a sleeve slidably mounted on said drill shaft, a larger gear on said sleeve arranged to be moved into mesh with the smaller pinion on said jack shaft, a smaller gear on said sleeve arranged to be moved into mesh with the larger pinion on said jack shaft, and means operable from the exterior of said housing for moving said sleeve to selectively mesh with either gear thereon with its respective pinion on the jack shaft and to unmesh the other gear.

In witness whereof, I hereunto subscribe my name this 5th day of July A. D. 1923.

GEORGE L. KOLLOCK.